United States Patent [19]

Coers et al.

[11] Patent Number: 5,511,383
[45] Date of Patent: Apr. 30, 1996

[54] METHOD AND APPARATUS FOR MAINTAINING THE LEVEL OF COLD LIQUID WITHIN A VESSEL

[75] Inventors: Don H. Coers, Naperville; Ronald C. Weber, Brookfield; Richard J. Kooy, Western Springs, all of Ill.

[73] Assignee: Chicago Bridge & Iron Technical Services Company, Oak Bridge, Ill.

[21] Appl. No.: 276,539

[22] Filed: Jul. 18, 1994

[51] Int. Cl.$^6$ .................................................. F17C 7/04
[52] U.S. Cl. ........................................... 62/48.1; 62/49.2
[58] Field of Search .................................. 62/48.1, 49.1, 62/49.2

[56] References Cited

U.S. PATENT DOCUMENTS

| 2,522,026 | 9/1950 | Evans | 62/49.2 |
| 3,690,115 | 9/1972 | Clayton | 62/49.1 |
| 3,858,404 | 1/1975 | Davis | 62/49.2 |
| 3,878,690 | 4/1975 | Bell et al. | 62/49.2 |
| 4,015,436 | 4/1977 | Seki | 62/48.1 |
| 4,131,015 | 12/1978 | Chawla et al. | 62/49.2 |

OTHER PUBLICATIONS

"Gram Integrated Fueling System," *LNG Express*, Jul./Aug. 1993, pp. 2–5.
National Fire Protection Association, *1994 Annual Meeting, Technical Committee Reports*.
National Fire Protection Association, *Standard for Liquefied Natural Gas, (LNG) Vehicular Fuel Systems*, May 1993.
"Recovery Danger: Using cylinders without high–level shutoff, overfill protection: A risk not worth taking," *Air Conditioning, Heating & Refrigeration News*, Apr. 1994.
Sporlan Valve Company, "Level Master Control," Product Literature, Sep. 1990.
Alco Controls, "Operating Principles and Application of the Thermostatic Expansion Valve," 1987.
Sporlan Valve Company, "Thermostatic Expansion Valves with Selective Charges," Oct. 1981.
Alco Controls, "Thermo Expansion Valves," May 1990.
Parker Refrigeration Components Group,"Condensed Catalog Halocarbon Products".
"National Fire Protection Association 59A," 1990 Edition.

*Primary Examiner*—Ronald C. Capossela
*Attorney, Agent, or Firm*—Marshall, O'Toole, Gerstein, Murray & Borun

[57] ABSTRACT

A method and apparatus for limiting the level of cold liquid within a vessel by sensing the expansion of cold liquid due to ambient heat leak, and venting pressurized vapor from the vessel to reduce the rate of expansion of the cold liquid.

30 Claims, 1 Drawing Sheet

5,511,383

1

METHOD AND APPARATUS FOR MAINTAINING THE LEVEL OF COLD LIQUID WITHIN A VESSEL

BACKGROUND OF THE INVENTION

This invention relates generally to methods and apparatus for storing cold liquid, and particularly to a method and apparatus for venting pressurized vapor from the vessel to reduce the rate of expansion of cold liquid and prevent overpressurization of the vessel.

Vessels for storing cold liquids can be used in vehicles or they may be stationary. Typically, such vessels are insulated to reduce the rate of warming of the stored liquid. Nevertheless, the vessel will absorb heat from the environment to its contents. When cold liquids such as liquefied natural gas are stored at −260° F. and then are warmed even slightly, they tend to expand in the liquid phase which increases the volume of the liquid and raises the pressure within the vessel. If the warmed liquid completely fills the vessel volume then the pressure increases rapidly.

To prevent the internal vessel pressure from rising to dangerously high levels, a minimum tank ullage can be provided to accommodate the maximum subsequent increase of liquid volume. The 1990 edition of the National Fire Protection Association, Inc. Standard for the Production, Storage, and Handling of Liquefied Natural Gas (NFPA 59A) includes paragraph 4-1.6 on Filling Volume of liquefied natural gas storage tanks and an accompanying FIG. 4-1, that an operator can use to determine the maximum filling volume to avoid overfilling. For example, using this chart an operator can determine that for a tank with a vapor relief valve setting of 200 psig and tank pressure after filling of 50 psig, the vessel can be filled to a maximum 88.0 percent capacity by volume. The 12.0 percent ullage space accommodates expanding liquid to avoid overpressurization of the vessel. If during normal, regular use liquid is withdrawn from the vessel at a rate greater than the volumetric expansion rate, then the 12.0% volume is unused and imposes an economic and volumetric penalty.

Not all tanks are provided with accurate means for determining tank volume and not all operators will have the necessary skill to apply the principles of FIG. 4-1 for a variety of tanks. Errors can occur in assessing internal pressure at filling and confirming pressure relief valve specifications. Further, intentional or negligent failure to abide by NFPA Standards is a possibility since enforcement can be difficult and costly.

NFPA 59A also includes paragraph 4-8 requiring provision for maintaining internal pressure and vacuum of liquefied natural gas tanks by releasing or admitting gas as needed. Pressure relief valves are intended to prevent overpressurization of a tank, but many are not designed to release liquid. Expansion of the cold liquid in an overfilled vessel can damage a pressure relief valve and result in further complications for maintaining internal tank pressures at safe levels. Thus, a method and apparatus for maintaining the level of cold liquid within a vessel is needed which maximizes the amount of cold liquid initially stored in the vessel yet avoids damage to the pressure relief valve by limiting the level of cold liquid below the pressure relief valve.

SUMMARY OF THE INVENTION

In accordance with the present invention, a method for controlling the level of cold liquid within a vessel includes the steps of sensing the expansion of the cold liquid to a

2 predetermined level within the vessel, and releasing vapor from the vessel as a result of sensing cold liquid at the predetermined level. The release of vapor results in the level of the cold liquid being maintained at or below the predetermined level.

A method in accordance with this invention may also include the step of withdrawing cold liquid from the vessel as a result of sensing cold liquid at the predetermined level.

The step of sensing cold liquid at the predetermined level may include positioning a cold liquid sensor in thermal communication with predetermined level, either directly or through a conduit that is in liquid communication with the vessel at the predetermined level. When the conduit is used, cold liquid expands to the predetermined level and drains into the conduit to cool the liquid sensor. This latter method may include warming the conduit to evaporate cold liquid in the conduit when the level of cold liquid in the vessel stays at or drops below the predetermined level.

Alternatively, the step of sensing cold liquid at the predetermined level includes positioning a differential pressure switch in liquid communication with the vessel, the differential pressure switch is able to sense the pressure head of the cold liquid at the predetermined level.

The step of releasing vapor from the vessel may include opening a thermostatic valve activated by a drop in gas pressure from the cooled gas bulb. Alternatively, vapor may be released using any appropriate valve activated by a differential pressure switch.

Also in accordance with the present invention is an apparatus for maintaining the level of cold liquid within a vessel. The apparatus includes a device to sense the expansion of cold liquid within the vessel to a predetermined level, and a venting device for releasing vapor from the vessel as a result of the sensing device sensing cold liquid at the predetermined level. The apparatus may also include a valve for withdrawing cold liquid from the vessel as a result of the sensing device sensing cold liquid at the predetermined level.

The sensing device may include a conduit in liquid communication with the vessel at the predetermined level and a sensor in thermal communication with the conduit. The sensor may be a gas bulb or it may be a differential pressure switch in liquid communication with said vessel having the ability to sense the pressure head of the cold liquid at the predetermined level.

The venting device may be a thermostatic vent valve that responds to a drop in pressure from a gas bulb.

DETAILED DESCRIPTION OF THE DRAWINGS

The following detailed description of the drawings uses, to the extent possible, the same numerals to describe the same or similar items in each of the figures.

Figure 1:
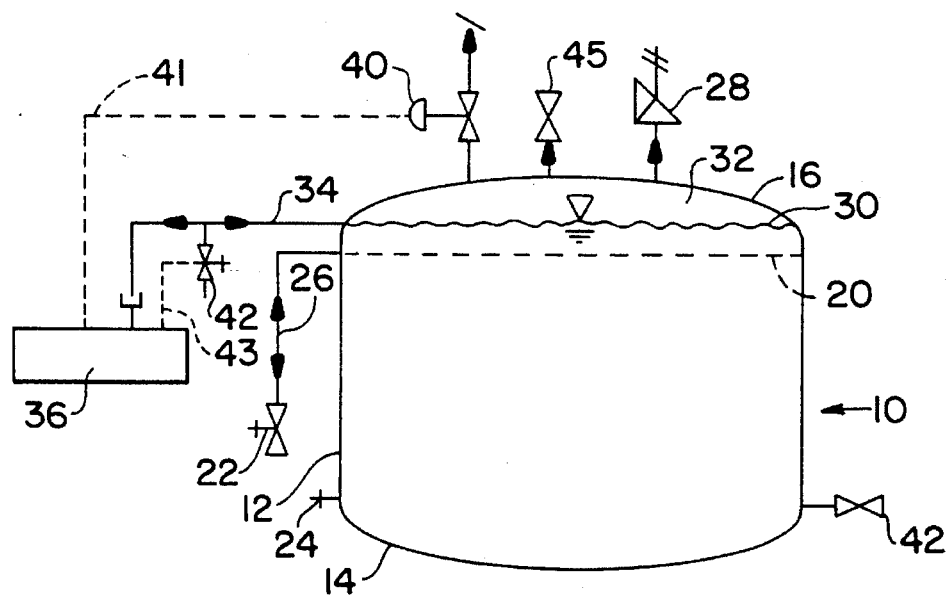
FIG. 1 is a schematic of a cold liquid storage vessel including apparatus for maintaining the level of cold liquid within the vessel according to the present invention.
Figure 2:
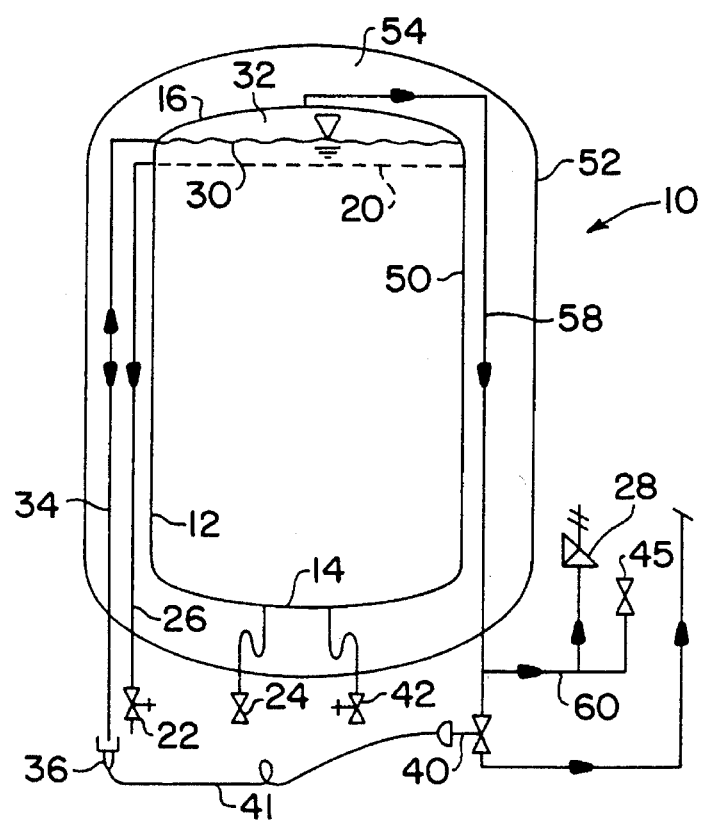
FIG. 2 is a schematic of a double-walled cold liquid storage vessel including an alternate arrangement of apparatus for maintaining the level of cold liquid within the vessel according to the present invention.

FIG. 1 illustrates a vessel 10 for storing cold liquid having a side wall 12, a bottom 14, and a top 16. Cold liquid for storage within the vessel 10 may be at cryogenic temperature such as liquefied natural gas, or liquid hydrogen, or liquefied nitrogen, etc. To reduce heat gain by the cold liquid, vessel 10 may be insulated or of a double-wall construction as illustrated in FIG. 2, wherein the annular space is typically evacuated.

Initially the vessel 10 is filled with cold liquid to a first level 20, shown by a dashed line in the figures. First level 20 can practically be higher than that permitted by NFPA 59A if the present invention is used to maintain the level of cold liquid within the vessel. First level 20 is known to an operator when filling vessel 10 through the use of any fill-limiting device or by differential pressure level instrument switch (not shown). One such fill-limiting device includes a trycock valve 22 in liquid communication with vessel 10 at the first lower level 20 via a pipe well 26. The operator opens trycock valve 22 before the filling begins and when cold liquid reaches the first lower level 20 it drains by gravity down pipe well 26, and out trycock valve 22. Once the operator sees cold liquid draining out trycock valve 22, no additional cold liquid is added and valve 24 and trycock valve 22 are closed. Alternatively, a differential pressure level switch (not shown) may be used to detect when the liquid level reaches elevation 20 and engage a valve operator to close valve 24. It should be obvious to those skilled in the art that vessel 10 can be filled through a combination of bottom fill valve 24 and a top fill valve (not shown).

Once vessel 10 is filled to the first level 20, the liquid may be partially removed via valve 42 from time to time, for example, and the vapor pressure and liquid level will typically remain within acceptable limits. Alternatively, vapor may also be removed from the vessel via valve 45. If use is restricted, however, then ambient heat will cause the cold liquid to expand and pressurize the vessel 10. As a safety measure, a pressure relief valve 28 is provided to vent vapor if internal pressures exceed a predetermined maximum. Pressure relief valve 28 is normally only intended to vent vapor and could be damaged if contacted with cold liquid.

As the cold liquid expands, it reaches a predetermined higher level 30 which is below pressure relief valve 28 and defines a pressurized vapor space 32. At the predetermined higher level 30 vessel vapor pressure is below that which will activate pressure relief valve 28 and cold liquid drains into conduit 34 which is in communication with vessel 10 through wall 12. Conduit 34 may extend downward to ground level and is preferably insulated to minimize heat leak to vessel 10. Conduit 34 may be a substantially vertical pipe that is capped to form a well.

At the downstream end of conduit 34, there is a sensor 36 either inside or outside of conduit 34, but in either location it is in thermal communication with conduit 34 such that it will be cooled when cold liquid flows into conduit 34. Sensor 36 may be a conventional remote external gas bulb that senses the cold liquid by being cooled and communicating a drop in gas pressure to a thermostatic valve such as the Model RT-1006-B1 or Model RT-1011-B1 available from Robertshaw Controls Company of Knoxville, Tennessee modified as necessary for cryogenic service. Alternatively, sensor 36 may be a differential pressure switch that responds to pressure caused by the head of cold liquid in conduit 34 or it may be positioned in the vessel at any level below the predetermined level and be adjusted to sense whatever pressure head would result at that position. Further, sensor 36 may be installed directly in vessel 10 and be heated slightly to avoid activation when cold liquid splashes during the filling operation.

Sensor 36 activates a vapor discharge valve 40 to release vapor from vessel 10. Sensor 36 either generates an electrical signal that is transmitted through a wire 41 or passes a gas pressure through a conduit, also represented by number 41. Wire 41 may be part of an electrical circuit that is closed when cold liquid contacts sensor 36 which results in an activating electrical signal being generated to open vapor discharge valve 40. Alternatively, conduit 41 may be a tube transmitting a pressure drop from a cooled gas bulb to the vapor discharge valve 40. The release of vapor from vessel 10 relieves internal vessel pressure and maintains the temperature so that the cold liquid does not expand above the predetermined higher level 30. Vapor discharge valve 40 may be a thermostatic valve or differential pressure actuated device or any appropriate mechanism for releasing vapor from vessel 10.

Vapor from the vessel can be released to the atmosphere, rejected to a pipeline, or retained in a secondary tank (not illustrated). Alternatively, drain valve 42 may also be opened as a result of cold liquid being sensed at the predetermined higher level 30 in a similar manner as the vapor release vent.

During normal operation of vessel 10 when the cold liquid level is low, the conduit 34 contains only vapor and is warmed to an equilibrium temperature above the liquid temperature by heat gain from the atmosphere or by a heater (not illustrated). The relatively warm temperature in conduit 34 when no cold liquid is present, prevents sensor 36 from causing vapor discharge valve 40 or drain valve 42 to open. Similarly, after cold liquid evaporates from conduit 34, sensor 36 stops generating an electrical signal or depressed gas pressure, as the case may be, and vapor discharge valve 40 and drain valve 42 will close.

FIG. 2 illustrates a vessel 10 having a side wall 12, a bottom 14, and a top 16. Vessel 10 of FIG. 2 is of a double-walled type and thus has an inner shell 50 and an outer shell 52 that are spaced apart to define an evacuated space 54. Vessel 10 may also be insulated to reduce heat leak.

Vessel 10 is filled with cold liquid, as described above, to the first level 20. After filling, heat gain by the cold liquid causes it to expand to a higher predetermined level 30.

Conduit 34 is maintained within the evacuated space 54 to the extent possible to minimize heat leak into vessel 10 and cold liquid drains into conduit 34 as described above. Sensor 36 is cooled by the cold liquid from conduit 34 and an electrical signal or gas pressure activates vapor discharge valve 40 to release pressurized vapor or, when desired, to drain valve 42 to release liquid.

In the FIG. 2 embodiment, vapor vent valve 40 is in vapor communication with the vessel vapor space 32 via conduit 58 which is fed through the evacuated space 54 to minimize heat leak to vessel 10. This arrangement permits pressure relief valve 28 to communicate with conduit 58 via conduit 60 upstream of vapor discharge valve 40 to provide a failsafe upon release should sensor 36 or vapor discharge valve 40 fail to perform as intended.

With either of the above described embodiments, vessel 10 can be used to store a cold liquid such as liquefied natural gas (LNG) or liquid methane. Cold liquid is initially filled to the first level 20 to provide a vapor space (sometimes referred to as ullage) that permits some expansion of the cold liquid but not as much as would be required if no means for maintaining the level of liquid were used. This results in a greater effective vessel volume available for storage of cold liquid.

Nevertheless, some vapor space will be needed and some expansion of the cold liquid will result due to heat leak into the vessel. The expansion is tolerated until it reaches the predetermined higher level 30 where sensor 36 is in thermal communication either directly or through conduit 34. When cold liquid cools sensor 36, vapor vent valve 40 is activated to release pressurized vapor. Sensor 36 may also activate a liquid discharge valve 42 for controlled release of cold liquid. Regardless, pressure relief valve 28 should not be contacted by cold liquid.

Once enough vapor and/or liquid have been released, the temperature will stabilize, and the level of cold liquid will remain at or just below the predetermined higher level. When cold liquid is removed from tank 10 the cold liquid that is in thermal communication with sensor 36 will warm and evaporate and no further signal will be generated to open vent valve 40 or liquid discharge valve 42.

The foregoing detailed description has been given for clearness of understanding only, and no unnecessary limitations should be understood therefrom as modifications will be obvious to those skilled in the art.

We claim:

1. A method for limiting the level of cold liquid within a vessel, said method comprising the steps of:
   (a) sensing the expansion of cold liquid to a predetermined level within said vessel; and
   (b) maintaining the temperature of the liquid by releasing vapor from the vessel as a result of sensing cold liquid at said predetermined level.

2. The method of claim 1 and further comprising the step of:
   (a) withdrawing cold liquid from said vessel as a result of sensing cold liquid at said predetermined level.

3. The method of claim 1 in which the step of sensing the expansion of cold liquid comprises:
   (a) positioning a cold liquid sensor in thermal communication with a conduit, said conduit in liquid communication with said predetermined level in said vessel; and
   (b) draining cold liquid into said conduit when said cold liquid expands to said predetermined level to cool said cold liquid sensor.

4. The method of claim 3 and further comprising the step of:
   (a) warming said conduit to evaporate cold liquid when the cold liquid in said vessel stops expanding.

5. The method of claim 1 in which the step of sensing cold liquid comprises:
   (a) positioning a gas bulb in thermal communication with said predetermined level so that said gas bulb is cooled when cold liquid reaches said predetermined level.

6. The method of claim 1 in which the step of sensing cold liquid comprises:
   (a) positioning a gas bulb in thermal communication with a conduit, said conduit in liquid communication with said predetermined level; and
   (b) draining cold liquid into said conduit when said cold liquid expands to said predetermined level to cool said gas bulb.

7. The method of claim 1 in which the step of releasing vapor from said vessel comprises:
   (a) opening a thermostatic valve which is in vapor communication with said vessel.

8. The method of claim 1 in which the step of sensing cold liquid comprises:
   (a) positioning a gas bulb in thermal communication with said predetermined level so that said gas bulb is cooled when cold liquid reaches said predetermined level; and
   the step of releasing vapor from the vessel as a result of sensing cold liquid at said predetermined level comprises:
   (b) opening a thermostatic valve which is in vapor communication with said vessel, said thermostatic valve opening in response to a drop in gas pressure from said cooled gas bulb.

9. The method Of claim 1 in which the step of sensing cold liquid comprises:
   (a) positioning a gas bulb in thermal communication with a conduit, said conduit in liquid communication with said predetermined level; and
   (b) draining cold liquid into said conduit when said cold liquid expands to said predetermined level to cool said gas bulb; and
   the step of releasing vapor from the vessel as a result of sensing cold liquid at said predetermined level comprises:
   (c) opening a thermostatic valve which is in vapor communication with said vessel, said thermostatic valve opening in response to a drop in gas pressure from said cooled gas bulb.

10. The method of claim 1 in which the step of sensing cold liquid comprises:
    (a) positioning a differential pressure switch in liquid communication with said vessel, said differential pressure switch having means for sensing the pressure head of the cold liquid at said predetermined level.

11. An apparatus for limiting the level of cold liquid within a vessel, said apparatus comprising:
    (a) means for sensing the expansion of cold liquid to a predetermined level within said vessel; and
    (b) means for maintaining the temperature of the liquid by releasing vapor from said vessel as a result of sensing cold liquid at said predetermined level.

12. The apparatus of claim 11 and further comprising:
    (a) means for withdrawing cold liquid from said vessel as a result of sensing cold liquid at said predetermined level.

13. The apparatus of claim 11 in which said means for sensing cold liquid at said predetermined level comprises:
    (a) a conduit in liquid communication with said vessel at said predetermined level; and
    (b) a sensor in thermal communication with said conduit, said sensor being cooled when cold liquid enters said conduit.

14. The apparatus of claim 11 in which said means for sensing the expansion of cold liquid comprises:
    (a) a gas bulb in thermal communication with said predetermined level.

15. The apparatus of claim 11 in which the means for sensing the expansion of cold liquid comprises:
    (a) a conduit in liquid communication with said predetermined level; and
    (b) a gas bulb in thermal communication with said conduit, said gas bulb being cooled when cold liquid enters said conduit.

16. The apparatus of claim 11 in which said means for releasing vapor from said vessel comprises:
    (a) a thermostatic valve in vapor communication with said vessel.

17. The apparatus of claim 11 in which the means for sensing the expansion of cold liquid to a predetermined level comprises:

(a) a gas bulb in thermal communication with said predetermined level; and said means for releasing vapor from said vessel comprises:

(b) a thermostatic valve in vapor communication with said vessel, said thermostatic valve having means for opening in response to a drop in gas pressure from said cooled gas bulb.

18. The apparatus of claim 11 in which said means for sensing the expansion of cold liquid to a predetermined level comprises:

(a) a conduit in liquid communication with said predetermined level; and (b) a gas bulb in thermal communication with said conduit, said gas bulb being cooled when cold liquid enters said conduit; and said means for releasing vapor from said vessel comprises:

(c) a thermostatic valve in vapor communication with said vessel, said thermostatic valve having means for opening in response to a drop in gas pressure from said cooled gas bulb.

19. The apparatus of claim 11 in which said means for sensing the expansion of cold liquid to said predetermined level comprises:

(a) a differential pressure switch in liquid communication with said vessel, and having means for sensing the pressure head of the cold liquid at said predetermined level.

20. The apparatus of claim 11 in which said means for sensing the expansion of cold liquid to a predetermined level comprises:

(a) a differential pressure switch in liquid communication with said vessel, and having means for sensing the pressure head of the cold liquid at said predetermined level;

and said means for releasing vapor from said vessel comprises:

(b) a vent valve in vapor communication with said vessel.

21. An apparatus for limiting the level of cold liquid within a vessel having an inner wall and an outer wall spaced apart from the inner wall to define an evacuated space, said apparatus comprising:

(a) means for sensing the expansion of cold liquid to a predetermined level within said vessel, said means at least partially positioned in said evacuated space; and (b) means for maintaining the temperature of the liquid by releasing vapor from said vessel as a result of sensing cold liquid at said predetermined level.

22. The apparatus of claim 21 and further comprising:

(a) means for withdrawing cold liquid from said vessel as a result of sensing cold liquid at said predetermined level.

23. The apparatus of claim 21 in which said means for sensing cold liquid at said predetermined level comprises:

(a) a conduit in liquid communication with said vessel at said predetermined level; and (b) a sensor in thermal communication with said conduit, said sensor being cooled when cold liquid enters said conduit.

24. The apparatus of claim 21 in which said means for sensing the expansion of cold liquid comprises:

(a) a gas bulb in thermal communication with said predetermined level.

25. The apparatus of claim 21 in which the means for sensing the expansion of cold liquid comprises:

(a) a conduit in liquid communication with said predetermined level; and (b) a gas bulb in thermal communication with said conduit, said gas bulb being cooled when cold liquid enters said conduit.

26. The apparatus of claim 21 in which said means for releasing vapor from said vessel comprises:

(a) a thermostatic valve in vapor communication with said vessel.

27. The apparatus of claim 21 in which the means for sensing the expansion of cold liquid to a predetermined level comprises:

(a) a gas bulb in thermal communication with said predetermined level; and said means for releasing vapor from said vessel comprises:

(b) a thermostatic valve in vapor communication with said vessel, said thermostatic valve having means for opening in response to a drop in gas pressure from said cooled gas bulb.

28. The apparatus of claim 21 in which said means for sensing the expansion of cold liquid to a predetermined level comprises:

(a) a conduit in liquid communication with said predetermined level; and (b) a gas bulb in thermal communication with said conduit, said gas bulb being cooled when cold liquid enters said conduit; and said means for releasing vapor from said vessel comprises:

(c) a thermostatic valve in vapor communication with said vessel, said thermostatic valve having means for opening in response to a drop in gas pressure from said cooled gas bulb.

29. The apparatus of claim 21 in which said means for sensing the expansion of cold liquid to said predetermined level comprises:

(a) a differential pressure switch in liquid communication with said vessel, and having means for sensing the pressure head of the cold liquid at said predetermined level.

30. The apparatus of claim 21 in which said means for sensing the expansion of cold liquid to a predetermined level comprises:

(a) a differential pressure switch in liquid communication with said vessel, and having means for sensing the pressure head of the cold liquid at said predetermined level;

and said means for releasing vapor from said vessel comprises:

(b) a vent valve in vapor communication with said vessel.

* * * * *